US011257315B2

(12) United States Patent
Kuenzi

(10) Patent No.: US 11,257,315 B2
(45) Date of Patent: Feb. 22, 2022

(54) ENCODER MULTIPLEXER FOR DIGITAL KEY INTEGRATION

(71) Applicant: CARRIER CORPORATION, Palm Beach Gardens, FL (US)

(72) Inventor: Adam Kuenzi, Silverton, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 16/074,926

(22) PCT Filed: Jan. 11, 2017

(86) PCT No.: PCT/US2017/012931
§ 371 (c)(1),
(2) Date: Aug. 2, 2018

(87) PCT Pub. No.: WO2017/136110
PCT Pub. Date: Aug. 10, 2017

(65) Prior Publication Data
US 2019/0035185 A1    Jan. 31, 2019

Related U.S. Application Data

(60) Provisional application No. 62/291,048, filed on Feb. 4, 2016.

(51) Int. Cl.
*G07C 9/28* (2020.01)
*G07C 9/00* (2020.01)
(Continued)

(52) U.S. Cl.
CPC ............ *G07C 9/28* (2020.01); *G07C 9/00174* (2013.01); *G07C 9/00571* (2013.01); *G07C 9/29* (2020.01);
(Continued)

(58) Field of Classification Search
CPC .................................................. G07C 9/00111
(Continued)

(56) References Cited

U.S. PATENT DOCUMENTS 7,209,029 B2    4/2007  Coelho et al.
7,500,602 B2 *  3/2009  Gray ...................... G06Q 20/10
                                                        235/375
(Continued)

FOREIGN PATENT DOCUMENTS

GB       2450332 A      12/2008
WO    2013/049730 A1     4/2013
WO    2013/122576 A1     8/2013

OTHER PUBLICATIONS

Lisa Terry, Next-Gen Locking Systems, Hospitality Technology Newsletter, Nov. 1, 2007.
(Continued)

*Primary Examiner* — Michael G Lee
*Assistant Examiner* — David Tardif
(74) *Attorney, Agent, or Firm* — Bachman & LaPointe, P.C.

(57) ABSTRACT

A system including a device operable to intercept a PMS request from the PMS to the encoder to obtain card data from the encoder, then send the card data to a credential service to provision a mobile phone with a virtual key. A method of provisioning credentials for a mobile device, the method including generating a request from a Property Management Systems (PMS); sending the request to an encoder through a device; determining if the request is for a virtual card at the device; and using an encoder 0 feature to check-in a guest from the encoder in response to a request for a virtual card.

20 Claims, 8 Drawing Sheets

(51) Int. Cl.
  *G07C 9/29* (2020.01)
  *H04W 4/80* (2018.01)
  *H04W 12/04* (2021.01)
  *H04W 12/30* (2021.01)
  *H04W 12/08* (2021.01)

(52) U.S. Cl.
  CPC ............ *H04W 4/80* (2018.02); *H04W 12/04* (2013.01); *H04W 12/35* (2021.01); *G07C 2009/00769* (2013.01); *H04W 12/08* (2013.01)

(58) Field of Classification Search
  USPC ........................................................ 235/382
  See application file for complete search history.

(56) References Cited

U.S. PATENT DOCUMENTS

| | | | |
|---|---|---|---|
| 8,682,245 | B2 | 3/2014 | Fyke et al. |
| 8,730,004 | B2 | 5/2014 | Elfströom et al. |
| 8,791,790 | B2 | 7/2014 | Robertson et al. |
| 8,793,784 | B2 | 7/2014 | Métivier et al. |
| 8,844,811 | B1 | 9/2014 | Rogers et al. |
| 8,884,738 | B2 | 11/2014 | Spangenberg et al. |
| 8,903,425 | B2 | 12/2014 | Guenec et al. |
| 8,903,978 | B2 | 12/2014 | Zerr et al. |
| 8,943,187 | B1 | 1/2015 | Saylor |
| 9,007,173 | B2 | 4/2015 | McIntyre et al. |
| 9,130,934 | B2 | 9/2015 | Warrick et al. |
| 10,735,201 | B1* | 8/2020 | Straitiff .............. G07C 9/00857 |
| 2007/0176739 | A1 | 8/2007 | Raheman |
| 2009/0066476 | A1 | 3/2009 | Raheman |
| 2010/0201482 | A1 | 8/2010 | Robertson et al. |
| 2012/0075057 | A1 | 3/2012 | Fyke et al. |
| 2012/0278090 | A1 | 11/2012 | Frankfort et al. |
| 2013/0043973 | A1 | 2/2013 | Greisen et al. |
| 2013/0212248 | A1 | 8/2013 | Neafsey et al. |
| 2013/0257590 | A1 | 10/2013 | Kuenzi et al. |
| 2013/0300446 | A1 | 11/2013 | Capulong et al. |
| 2014/0300446 | A1 | 10/2014 | Notheis et al. |
| 2014/0365781 | A1 | 12/2014 | Dmitrienko et al. |
| 2015/0102906 | A1 | 4/2015 | Gerhardt et al. |
| 2015/0109098 | A1 | 4/2015 | Singh |
| 2015/0170448 | A1 | 6/2015 | Robfogel et al. |
| 2015/0186803 | A1 | 7/2015 | Stong |
| 2015/0199863 | A1 | 7/2015 | Scoggins et al. |
| 2015/0279132 | A1 | 10/2015 | Perotti |
| 2016/0005248 | A1 | 1/2016 | Aase |
| 2017/0287248 | A1* | 10/2017 | Aase .................. G07C 9/00309 |

OTHER PUBLICATIONS

Assa Abloy Hospitality Mobile Access, Art. No. 4819087, Sep. 2015.

International Search Report for PCT/US2017/012931 dated Apr. 4, 2017.

* cited by examiner

ENCODER MULTIPLEXER FOR DIGITAL KEY INTEGRATION

BACKGROUND

The present disclosure relates generally to how guests can access their room with a mobile phone, and more particularly, to a system and a method to intercept a Property Management System (PMS) request to the encoder and to get the card data from the encoder and then send the data to a credential service to provision a guest mobile phone with a virtual key.

An access control system is typically operated by encoding data on a physical key card that indicates access rights. Some access control systems are online where the reader can use some means to communicate with the access control system. In online systems the access rights are usually a reference identifier. Other access control systems are offline and the access rights are encoded as data that can be decoded and interpreted by the offline lock to retrieve the access rights. An example is a hotel locking system where a front desk encodes a guest card and an offline, battery powered lock on a guest room door has the means to decode the card and permit or deny access based on the encoded access rights. Some methods of encoding access rights include sequencing where subsequent access rights have a sequence number that is greater than the prior access rights.

Some access control systems have utilized a device other than a physical key card to communicate with a lock, such as via audio tones from a mobile device, where there is also a separate method of indicating access rights that is different from the data on the key card. Such systems are partially effective in that a person can open the lock by either means. But because of the separate means for indicating access rights where the lock can not determine which access right was sequenced before the other access right, these systems do not allow use of the ubiquitous physical key card in conjunction with the mobile device. The advantage of using the virtual card data is that no synchronization is required between separate systems for indicating access rights, and the lock can have a unified audit trail.

Hotels may provide for guests to access their room with a smartphone. Existing Property Management Systems (PMS) connect directly to encoders via an API to request to "print" physical guest room cards. In order to send the card data to a phone, the hotel system must request the card data from the on-property encoder and upload to a credential service which can then securely deliver the card data to a specified guest's phone. But, this requires full integration with the hotel system PMS with the credential service or a new type of encoder.

In some systems, there is a desire to deliver card data to a guest phone from a system that does not need to update the PMS software or without changing the encoder. So, without modifying either the PMS or the encoder, there exists a need to intercept this PMS request to the encoder and to get the card data from the encoder and then send the data to a credential service so it can provision a guest phone with a virtual key.

SUMMARY

A system according to one disclosed non-limiting embodiment of the present disclosure can include an encoder; and a device operable to intercept a Property Management Systems (PMS) request to the encoder to obtain card data from the encoder, then send the card data to a credential service to provision a mobile phone with a virtual key.

A further embodiment of the present disclosure may include, wherein the device is transparent to the PMS and the encoder except when a Property Management Systems (PMS) requests a virtual card.

A further embodiment of the present disclosure may include, wherein the device is a software service.

A further embodiment of the present disclosure may include, wherein the device is a software service on the same network as the PMS software.

A further embodiment of the present disclosure may include, wherein the device is a hardware device.

A further embodiment of the present disclosure may include, wherein a request for the virtual key is queued in a request service, the request service including a queue of requests accessible by the device.

A further embodiment of the present disclosure may include, wherein the credential service is operable to interact with the mobile phone to download and manage digital access credentials.

A further embodiment of the present disclosure may include, wherein the credential service is operable to manage digital access credentials by creating a virtual key that is operable to operate an access control.

A further embodiment of the present disclosure may include, wherein the mobile device includes a smartphone.

A further embodiment of the present disclosure may include, wherein the access control is a lock.

A method of provisioning credentials for a mobile device, the method according to another disclosed non-limiting embodiment of the present disclosure can include receiving a request from a Property Management Systems (PMS) to an encoder through a device; determining if the request is for a virtual card at the device; and retrieving virtual card data from the encoder.

A further embodiment of the present disclosure may include, wherein retrieving virtual card data from the encoder comprises an encoder message addressed to encoder 0 rather than to the encoder number requested in the Property Management Systems (PMS) request.

A further embodiment of the present disclosure may include, wherein determining if the request is for a virtual card by examining the Property Management Systems (PMS) request.

A further embodiment of the present disclosure may include, wherein examining the request includes identifying if the request is for a non-physical encoder number.

A further embodiment of the present disclosure may include, wherein examining the request includes identifying guest data in the data elements in the request.

A further embodiment of the present disclosure may include, wherein the device sends the PMS request directly to the encoder with no modification and sends the response back with no modification in response to a virtual card not being requested.

A further embodiment of the present disclosure may include, wherein the method is performed in a software service that is loaded on a computer that is on the same network as the PMS software.

A further embodiment of the present disclosure may include, wherein the PMS requests a card for physical encoding and a separate request service requests the virtual card for digital encoding.

A further embodiment of the present disclosure may include, wherein a request for the digital encoding is queued in the request service.

A further embodiment of the present disclosure may include, wherein the device presents a portal to a front desk administrator.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
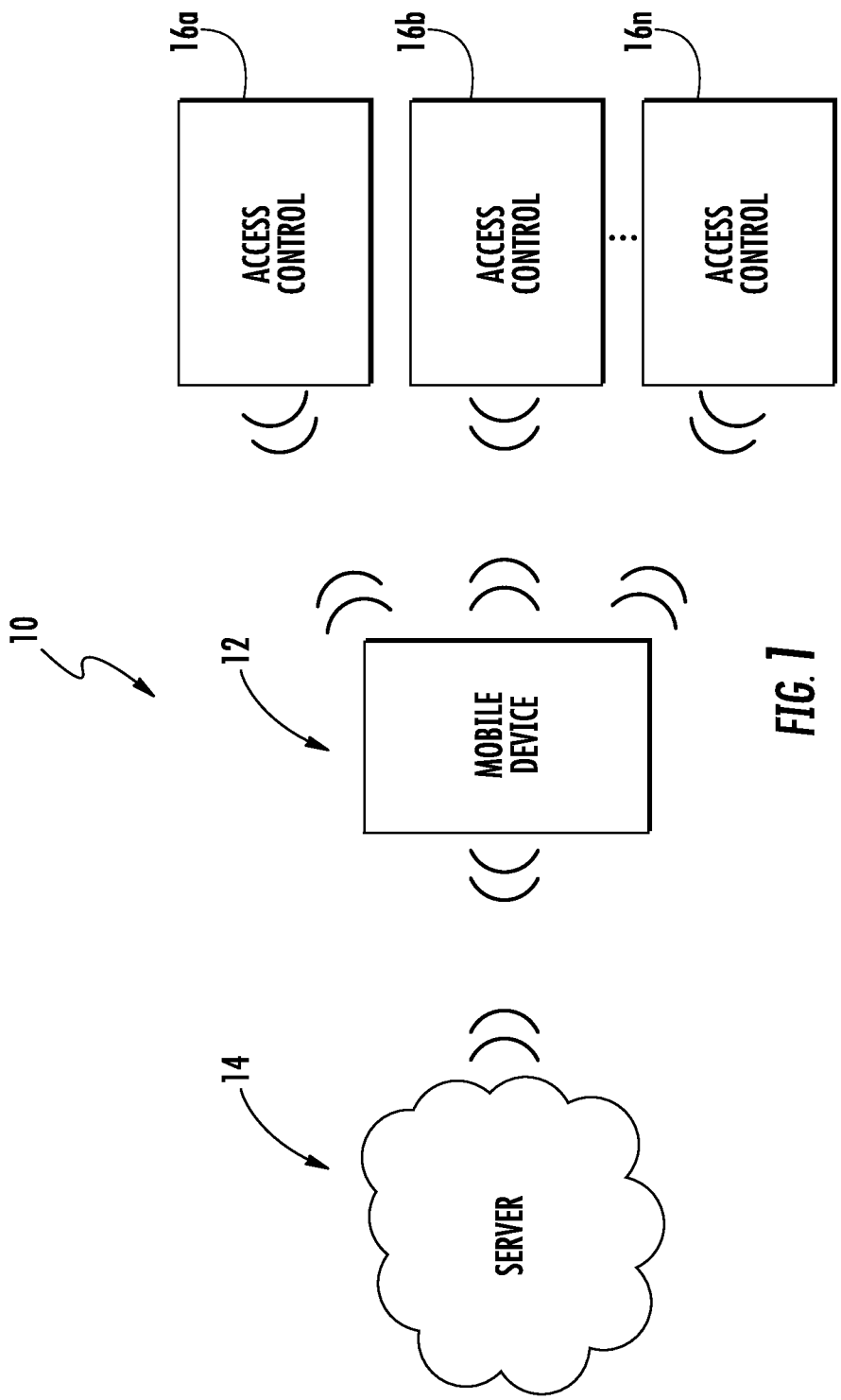
FIG. 1 is a general schematic system diagram of a user authentication system.

FIG. 1 schematically illustrates an access control system 10. The system 10 generally includes a mobile device 12, a server 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software.

The mobile device 12 is a wireless capable handheld device such as a smartphone that is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
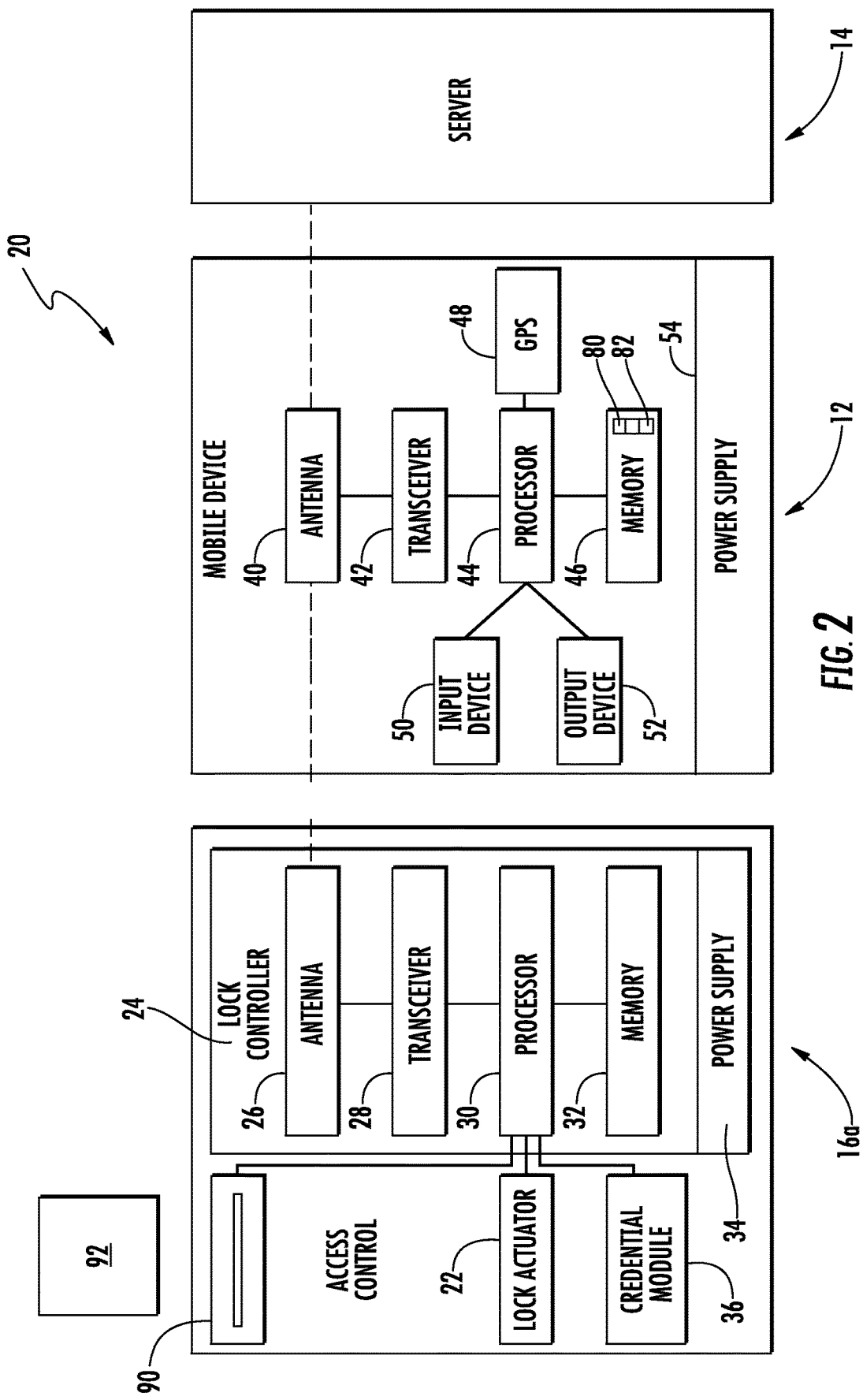
FIG. 2 is a block diagram of the user authentication system.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

While the figure shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28. Alternatively, in other embodiments, the credential module 36 can be embodied as software run in lock processor 30.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and in this embodiment a mobile credential is retrieved in real time and is passed to the credential module 36 without storing first in the key memory 46 on the mobile device 12.

Figure 3:
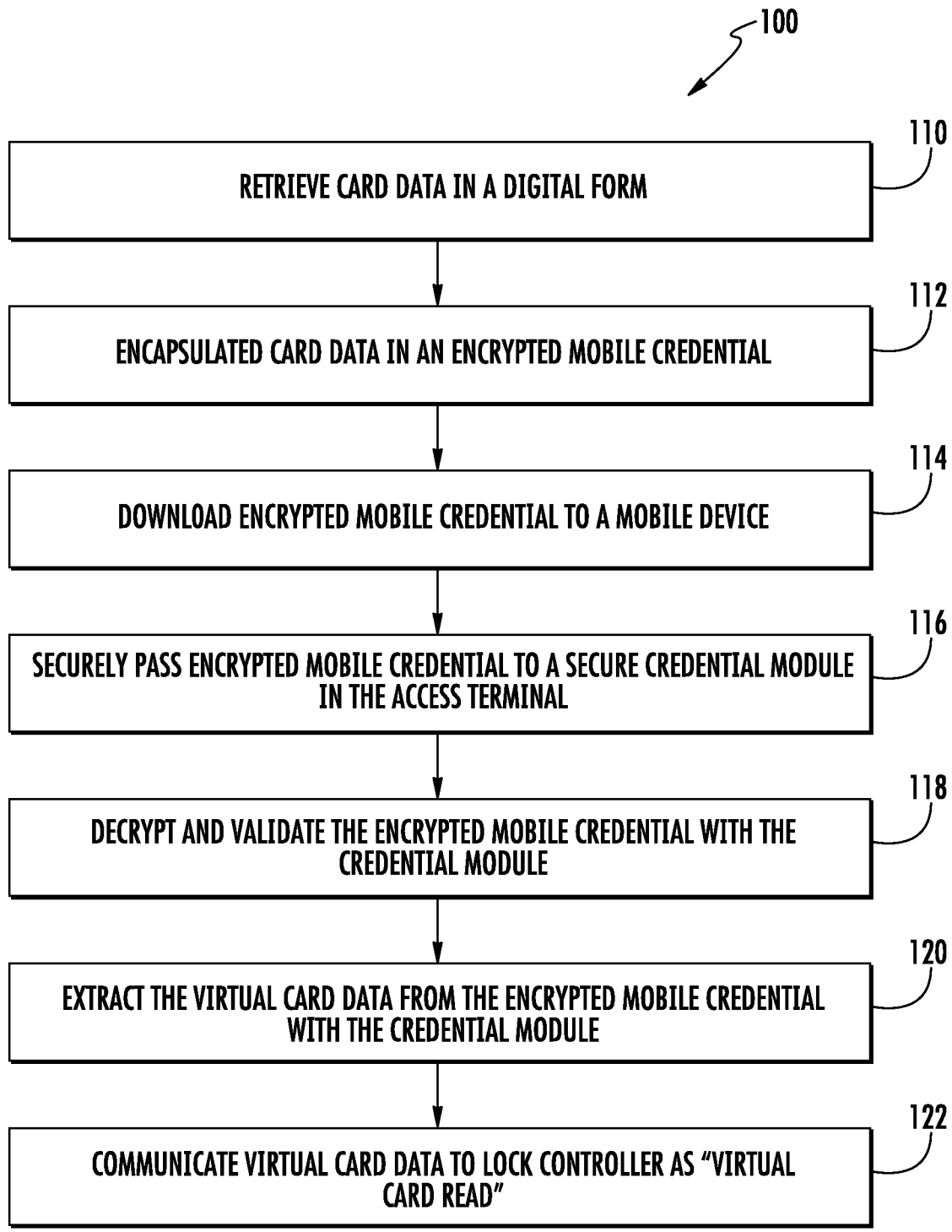
FIG. 3 is a flowchart of a credential management method performed by the user authentication system.

With reference to FIG. 3, a method 100 to facilitate communication of a credential representative of data that would normally be physically encoded on the key card 92 is retrieved in a digital form (step 110), encapsulated in an encrypted credential (step 112), downloaded to the mobile device 12 (step 114), securely passed to the credential module 36 (step 116) that decrypts and validates the credential (step 118), extracts the virtual card data (step 120), then passes the virtual card data into the lock controller 24 as a "virtual card read" (step 122). This, for example, permits a user to bypass a front desk of a hotel and go directly to their room as will be further described. The encrypted credential may be generated by the server 14 using well known techniques for digital certificate creation and encryption using cryptographic algorithms such as AES, ECC, RSA, and the like. For example, the credential may contain but is not limited to including a credential identifier, a parameter indicating the type or format of the credential, it may contain encrypted data such as the virtual card data, and it may contain a digital signature. The encrypted data may be encrypted with an AES-128 encryption key that can be known to the credential module 36. Or it may be encrypted with a derived encryption key that can be determined from information contained in the credential. Further, the digital signature may be a CBC-MAC type signature based on an AES-128 encryption key, for example, that can be known by the credential module 36. Or, it could be a digital signature based on a private key known to the server 14 and can be validated by a public key known to the credential module 36.

Figure 4:
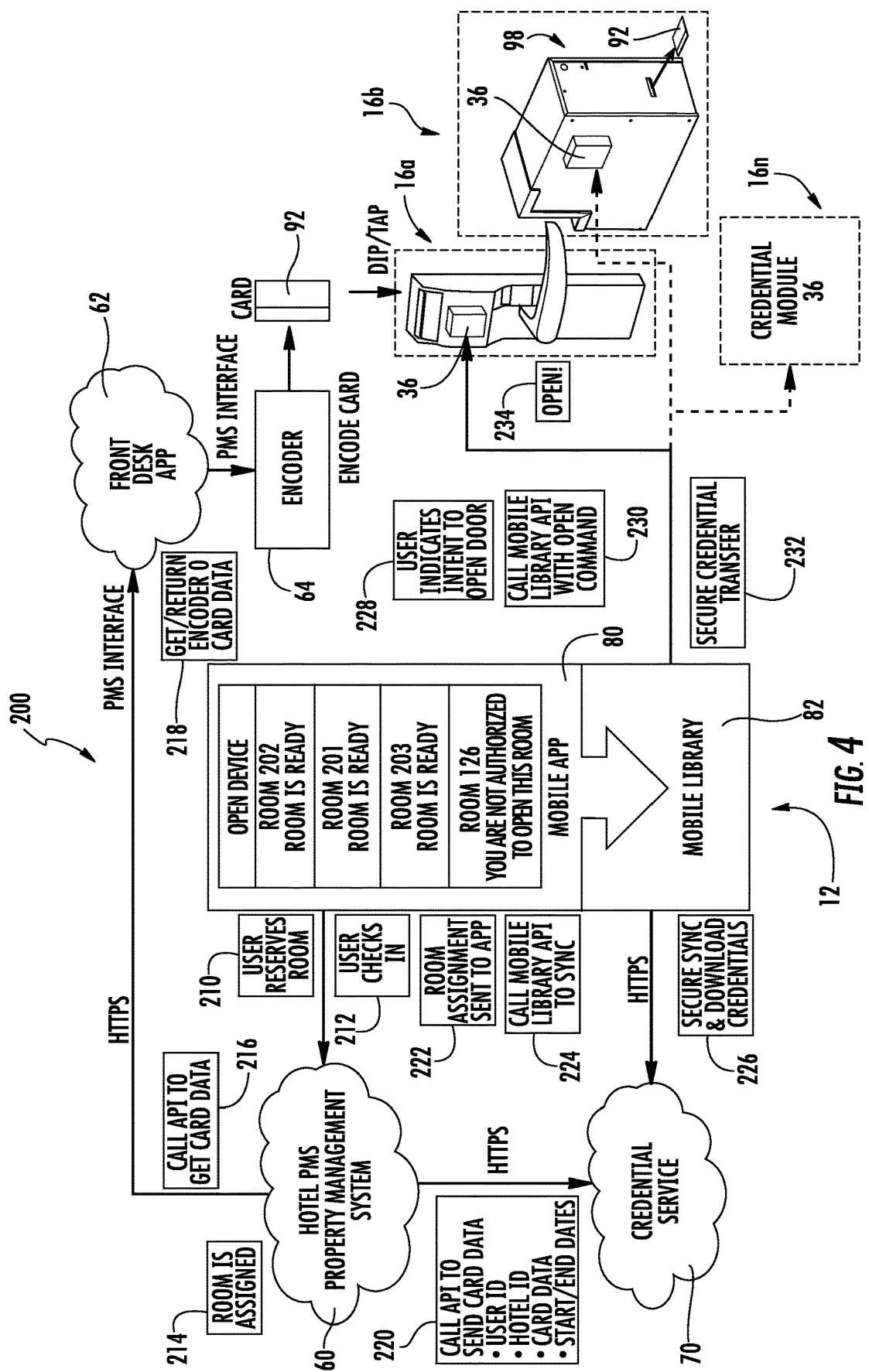
FIG. 4 is a flowchart of a credential management method performed by the user authentication system according to one disclosed non-limiting embodiment.

With reference to FIG. 4, one example bypass the front desk method 200, is initiated by a user who first reserves a hotel room (step 210) through any process supported by a hotel, such as mobile reservations, web sites, travel agents, etc. Later, a check-in procedure confirms their stay (step 212). Again, this can be performed through any process supported by the hotel.

Next, a room is assigned in a hotel property management system 60 based on the guest preferences (or room selection) and the room availability on check-in (step 214). The hotel property management system 60 may use a software-to-software application programming interface (API) provided by a front desk application 62 to request card data in a digital form (step 216). The front desk application 62 may range from a stand-alone encoder 64 to a complete software package running in a cloud that is operable to encode a virtual card for the room that was selected and return the virtual card data back to the hotel system (step 218).

Next, the hotel property management system 60 will make another software-to-software API call to a credential service 70 after the hotel system has authenticated the user and has allocated a room stay reservation (step 220). The pertinent information is communicated to the credential service 70 with an indication to include, for example, what hotel property, what room, what guest (e.g. User ID), what dates and also the virtual card data for the stay.

Simultaneous, or in sequence with sending the virtual card data to the credential service 70, the hotel property management service 60 communicates an indication to the user (again, through any conventional method) that the check-in is confirmed and the room is assigned (step 222).

Next, a mobile device 12 based hotel loyalty mobile application 80 will utilize a software-to-software API in a mobile library 82 (step 224) to download credentials from the credential service 70 (step 226). The mobile library 82 will securely authenticate to the credential service 70 with a prior established shared secret that may change on every successful connection.

Once authenticated, the credential service 70 generates at the time of the communication from the mobile library 82 the credentials for the user and encrypts into the credentials the virtual card data received in step 220 for the guest associated with this instance of the mobile library. One credential is generated for each door or access point and the virtual card data will be the same in each of these separate credentials, but may be encrypted with a unique key for the particular door or access point. The method of encryption may be AES, 3DES, or other such encryption method. The method and type of credential used may be a compressed digital certificate or a standard based certificate like X.509 or other certificate format known to the art. That is, for example, the virtual card data is encrypted into the credential with a unique key known by the credential module 36 and by the credential service 70.

The mobile library 82 will download and store the list of credentials on the mobile device 12 using native OS protections and additional encryption of data with device specific information, e.g., UDID, IMEI, IMSI, MAC addresses, etc. Now that the check-in is complete and the encrypted mobile credential (with virtual card data) is resident on the mobile device 12 (FIG. 2), the user can operate the access control 16 in an offline mode at any later time without the mobile device 12 being required to be connected to the credential service 70. Additional embodiments may have the mobile device 12 download a credential at the same time mobile device is communicating to access control 16 at the same time the user wishes to access their room, for example.

When the user wishes to access their room (step 228), the user indicates such intent through a gesture, a click of a button, a tap on the screen, a finger print read, password, proximity to the lock, touching the lock, etc. In response to this, intent, the hotel loyalty mobile application 80 again calls the software-to-software API in the mobile library 82 to initiate the secure transfer of the encrypted mobile credential to the access control 16 (step 230). While the loyalty application 80 initiates the transfer, the mobile library implements the secure transfer separately in the next step.

Secure transfer of the credential (step 232) may start with a process of the mobile library 82 listening for a signal advertisement such as Bluetooth low energy (BTLE) advertisements from in-range access controls 16. That is, the access controls 16 are advertising their presence on a periodic rate with advertisement data that indicates an identifier of the access control 16 and the mobile device 12 can listen and connect automatically without the person having to push a button to wake-up a sleeping, battery powered lock 16 or to get out of a vehicle to interact with a reader access point on a garage door or other device. The reader access point is another type of lock 16. Another embodiment is to use Near Field Communication (NFC) and the person 'taps' their mobile device to the lock 16 and a secure credential exchange transfers the mobile credential to the access control 16 (step 232). Secure credential exchanges can be done using standard techniques such as establishing a session key, encrypting communication messages, and validating the authenticity of message sender and receiver.

In the preferred embodiment where the access control advertises using Bluetooth low energy (BTLE), the mobile library 82 filters the received advertisements based on the received identifier of the access control 16 and by comparing with identifiers contained in or associated with each credential in the list of mobile credentials and based on the user intent to access a particular room. Once an advertisement is received for a target access control 16, the mobile library 82 initiates a wireless connection, and performs a secure transfer of the encrypted mobile credential (step 232). The secure transfer may utilize a unique session encryption key and standard cryptographic algorithms and techniques. It should be appreciated that the data can be securely transmitted over any wireless link, to include but not be limited to BTLE, zigbee, Near Field Communication, etc.

The credential module 36 will receive the encrypted mobile credential, then validate and decrypt the encrypted mobile credential to retrieve the virtual card data. The decryption and validation may include, but not be limited to, validating a digital signature, validating the type of the credential, validating that the credential identifier matches an identifier in the lock memory 32, validating a starting date and an expiring date of the credential, validating the source of the credential, etc. (step 118; FIG. 3). Once validated and decrypted, the virtual card data is extracted (step 120; FIG. 3).

The virtual card data is then communicated via hardware and software interfaces, depending on embodiments, to the lock controller 24 which may further decrypt the virtual card data, processes the data based on lock vendor rules, then open the lock if entry is permitted (step 234). Notably, the virtual card data is communicated into the lock controller 24 as a "virtual card read" in a data format equivalent to that of a physical key card. This thus permits the continued usage of traditional guest key cards 92 such as that of a family member, or a guest that just wants a copy of the physical key card 92, along with usage of the mobile device 12.

The audit trail uploaded by the mobile device 12 can be just the audits generated by the mobile device 12 itself, or can be the unified audits including openings by the guest using a physical key card. In addition, when the lock 16 is opened, a battery status or other maintenance information thereof may be uploaded into the audit trail from the mobile device 12 to the credential service 70 so that the hotel can be notified of low battery conditions and proactively change the batteries, or perform other maintenance. Other information associated with the audit trail can include, for example, failed openings or failed attempts or credentials that failed validation.

Usage of the "virtual card read" maintains a contiguous audit trail and also maintains all the known use cases for access control that are already encoded into traditional card data. Furthermore, the credential module 36 is lock vendor agnostic, so that any lock vendor's data could be passed through to allow each lock vendor to independently innovate card data. Further, the credential module 36 may be supplied by a different company than the lock 16. And also, the server 14, mobile device 12, and credential module 36 may have no means for further decrypting or validating the card data other than treating it like a data object to be encoded, encrypted, transferred, retrieved and delivered. Additionally, the "virtual card read" can be used offline without requiring the mobile device 12 to be online with a Wi-Fi connection or real time connection to a credential service. That is, the data for the "virtual card read" is stored on the mobile device 12 and passed securely to the credential module 36 in an offline mode. This is not to limit the capability to also send the "virtual card read" in an online mode. An additional benefit is that any access controls 16 can use any card types in addition to using a credential module 36, where the card types include but are not be limited to, Magnetic strip, RFID, Proximity, etc.

In another disclosed non-limiting embodiment, the credential module 36 can be used for many purposes, to include, but not be limited to, passing data to a self-service hard-key dispenser unit 98 that produces physical key cards 92. The hard-key dispenser unit 98 has a credential module 36 that receives the virtual card data, decrypts, extracts and sends to a lock controller 24 configured to encode the data onto a physical key card 92. That is, the virtual card data on the mobile device 12 is written to a physical key card 92 by the unit 98 and dispenses the key card 92 in an automated manner. The unit 98 does not require any user interface besides the dispensing element for the key card 92 and a unit power source, including but not limited to batteries, mains power, energy harvesting, and the like. The user interface for the unit 98 is really the interface of the mobile device 12. When the unit 98 begins to run low on blank key cards 92, the mobile device 12 can upload to the credential server 70 an indication of the status that can be turned into a report to notify the hotel that the unit 98 needs to be refilled.

In other disclosed non-limiting embodiments, the virtual card data can be standard access control card data (i.e. identification data) for badge access systems, or integrated into a vending machine with the virtual card data as credit card information, tokens, purchase reference identifiers, or the like.

Figure 5:
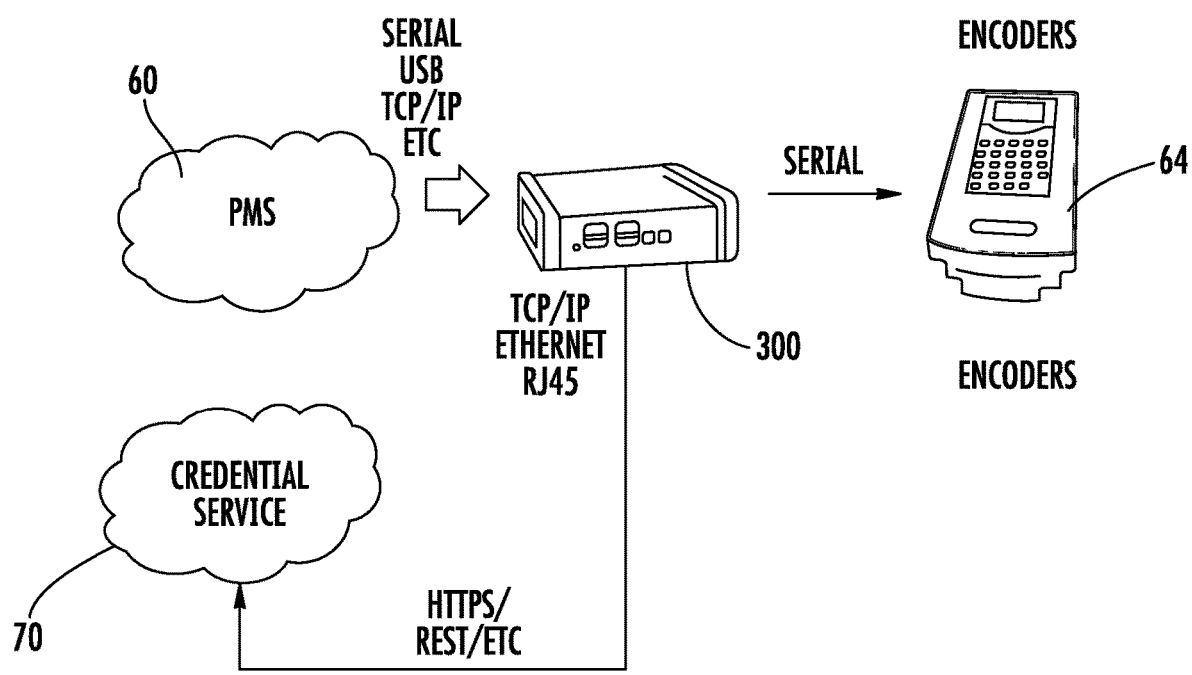
FIG. 5 is a schematic view of a PMS multiplexer according to one disclosed non-limiting embodiment.

With reference to FIG. 5, a device 300 connects to the PMS 60 on one side and to the encoder 64 on the other side.

The connection to the PMS 60 could be made as a RS232 serial port connection that is the same as offered by many of the legacy installed encoders. Or, the connection could be USB, or a networking LAN connection, wireless, or any type of wired or wireless connectivity between the PMS and the device.

The connection to the encoder 64 may be in whatever form the encoder 64 accepts, which is typically serial/RS232 on legacy encoders, however some encoders support TCP/IP network connections as well. Additionally, the device 300 has the ability to send messages to the Credential Service 70 that is installed and generally reachable on the Internet or LAN. The Credential Service 70 would have the capability (not shown) to interact with, download, and manage, digital access credentials for the mobile phones used by guests. Also not shown would be any interaction between hotel reservation systems that would provide additional information to the Credential service for other reasons. The encoder 64 can be a single 'master' encoder or a set of encoders that respond to the master encoder. Or, the encoder could be a plurality of encoders accessible to the device 300. Or, the encoder 64 could be a software service that provides the PMS interface to some other means of encoding a card.

Figure 6:
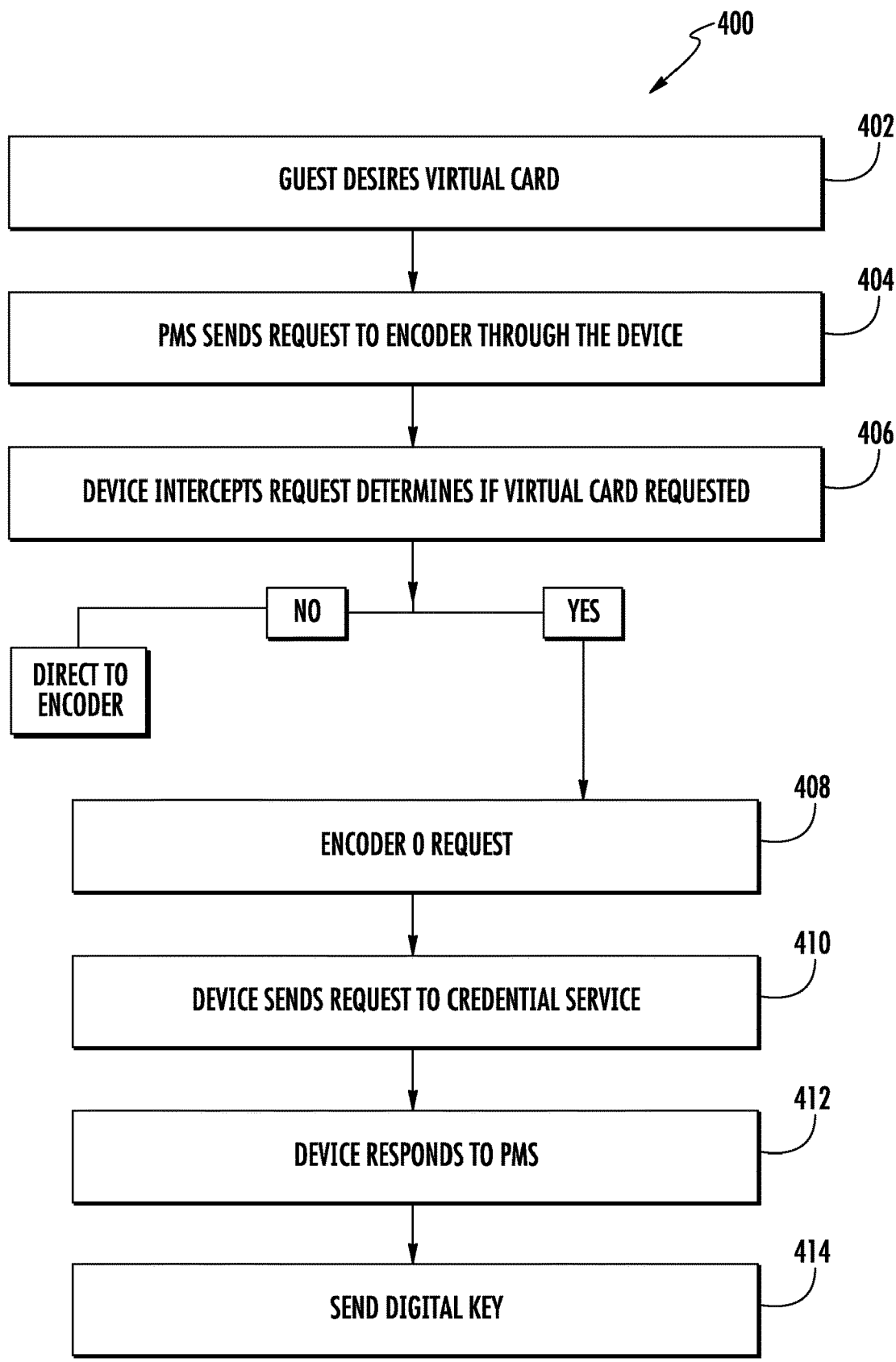
FIG. 6 is a block diagram illustrating operation of the PMS Encoder Multiplexer.

With reference to FIG. 6, the device 300 is transparent to the PMS 60 and encoder 64 except when the PMS 60 requests a virtual card. A method 400 according to one disclosed non-limiting embodiment of requesting a virtual card is as follows:

A user (typically hotel staff) uses the PMS interface to check-in a guest into a room and would indicate that a guest wants to use a virtual card (Step 402) by specifying a non-physical encoder number (i.e. a large encoder number like '88' or '99'). Typically, encoders are sequenced starting with 1, 2, 3, etc. These encoders 64 can be specified from the PMS 60 so that the operator can pick the nearest encoder, or one that is not already in use. In this case, a non-physical encoder number could be specified or allocated that would indicate a virtual encoding request. The PMS software, however, would not recognize this as a non-physical encoder and would send as a normal encoder request.

Optionally, the user can enter some special data, for example into the TRACK 1 or TRACK 2 fields, or into the PMS ID/Password field that is used with the encoder API. If these fields are available on the PMS, the additional information may include, for example; loyalty ID, a Phone number, an Email Address, or a confirmation number or a data element that can be later used by the Credential Service to determine which Guest to send the mobile credential.

Next, the PMS 60 sends the request to the encoder 64 through the device 300 (Step 404).

Next, the device 300 intercepts the request and determines if the request is for making a virtual card by examining the data elements in the request as noted above (Step 406). If the virtual card is not requested, then the device sends the PMS 60 request directly to the encoder 64 with no modification and sends the response back with no modification.

Next, if a virtual card is requested, the device 300 uses encoder 0 and requests to check-in the guest from the encoder 64 (step 408). The encoder responds to the encoder 0 request with the virtual card data rather than encoding a physical card. The encoder 0 feature is existing functionality that legacy encoders 64 already support.

Next, now that the device 300 has the virtual card data, the device 300 sends a message to the credential service 70 with data elements (step 410) including, for example: information from the PMS 60, and information from the encoder 64. Information from the PMS 60 may include, but is not limited to, a loyalty ID, a phone number, and email address, a confirmation number, a check-in time, a check-out time, permitted room(s), etc. Information from the encoder 64 may include, for example, time of encoding, virtual card data, etc.

After a successful response from the credential service 70, the device 300 then responds to the PMS 60 request with a "successful" message to indicate that the operation was completed successfully (step 412).

Afterwards, the credential service 70 uses the virtual card data and other information to send a Digital Key to a guest phone (step 414).

In another embodiment, device 300 may be a software service that is loaded on the same computer or on a computer on the same network as the PMS software. The PMS software may use a virtualized serial port or connection to the software which would implement the method and utilize the physical connections of the computer to reach the encoder and implement the method above.

With continued reference to FIGS. 5 & 6, in still another embodiment of the method 400, a PMS may have no capability to enter additional information or indicate a virtual card request in step 402. In this embodiment, step 406 would determine that all requests would want virtual cards requested and would follow step 408 including receiving back at the device 300 the virtual card data. Then the device 300 would send another message to the encoder 64 with the correct requested encoder number specified by the PMS as a "copy" card message rather than as a new-guest check-in. In this case, the encoder 64 would actually write to a physical card. Optionally, the encoder 0 and regular encoder requests could be sent in alternate sequence order as well where the regular encoder request is the 'check-in' and the encoder 0 request is the 'copy card' request.

Next, in step 410, now that the device 300 has the virtual card data, the device 300 sends a message to the Credential Service 70 with data elements, including, for example, information from the PMS 60 (if available), and information from the encoder 64.

After a successful response from the credential service 70, the device 300 then responds to the PMS request, step 412, with a "successful" message to indicate that the operation was completed successfully. Afterwards, the credential service uses the virtual card data and other information to send a Digital Key to a guest phone (step 414). Thus, the guest will have both a physical credential, and a virtual credential, based on a single message from the PMS 64. It's likely that the PMS 64 has not specified enough information to identify the guest. In this case, the device 300 has obtained the virtual card data and has sent it to the credential service 70 but the credential service 70 would not otherwise know which phone to which it is to be sent. In this case, the credential service 70 caches the virtual card data until additional information becomes available to identify the guest from some other source and then makes a determination of the who the guest is and sends the digital key (step 414) once the guest is determined. The additional information to make a determination of the guest identity may be obtained via a Web portal associated with the credential service where an authorized administrator (i.e. front desk operator) identifies that a virtual card is available in the credential service but not assigned and based on the room ID and check-in/out dates determines who to send the virtual card mobile credential to by:

i. Indicating a phone number or email address or identifier;

ii. Indicating a loyalty account; or iii. Indicating a virtual serial number associated with the guest phone (through a separate registration step of the mobile device with the credential service).

Alternatively, a separate portal from the credential service where the front desk administrator indicates in the portal a guest request for a mobile key and the requested room. The portal may send this information to the credential service 70 which associates the information with the virtual card data from the encoder 64 based off of common data elements such as the same room, same check-in times, etc. and then makes the determination of the guest. This separate portal could be hosted by the device 300 and viewable on a connected display or on another PC on the same network. Or, this portal could be hosted along with the credential service.

Alternatively, an automatic data exchange with a hotel reservation system where guest reservations have been made using a data comparison between information in the reservation system and information in the credential service. A determination can be made based on the guest check-in, check-out times, their assigned room, etc. to determine the guest automatically based on this information.

Alternatively, the determination may be performed on demand by a guest who requests a virtual card and submits their confirmation number to a portal. The portal uses this to look up their reservation information and send it to the credential service so that the credential service can associate it with the information from the device and then deliver the mobile credential to the guest phone.

Alternatively, the determination may be performed on demand by a guest kiosk. The guest presents their physical guest card and indicates one of their phone number, email address, identifier, loyalty ID, serial number, or some identifier. The kiosk determines which virtual card data belongs to this guest based on reading the guest card and then sends an indication to the Credential Service to send the credential to the guest's phone. It would be advantageous to also include the reservation confirmation number or some other information to authenticate this transaction that could be confirmed by the Credential Service via another hotel service (not shown) that this is a valid request.

Alternatively, the determination may be performed on demand by a guest who is at an offline Kiosk that reads their physical guest card, encrypts the contents of the card and presents it as a QR code or as a numerical code on a display. The guest can use their phone to take a picture or enter the code and submit the information to a portal associated with the Credential Service. The Credential service identifies the sender as the target mobile device, decrypts the information and from that determines the virtual card data and credential to send back to the guest mobile device. Again, it may be advantageous to include some other piece of information, such as the confirmation number, to authenticate the request.

Figure 7:
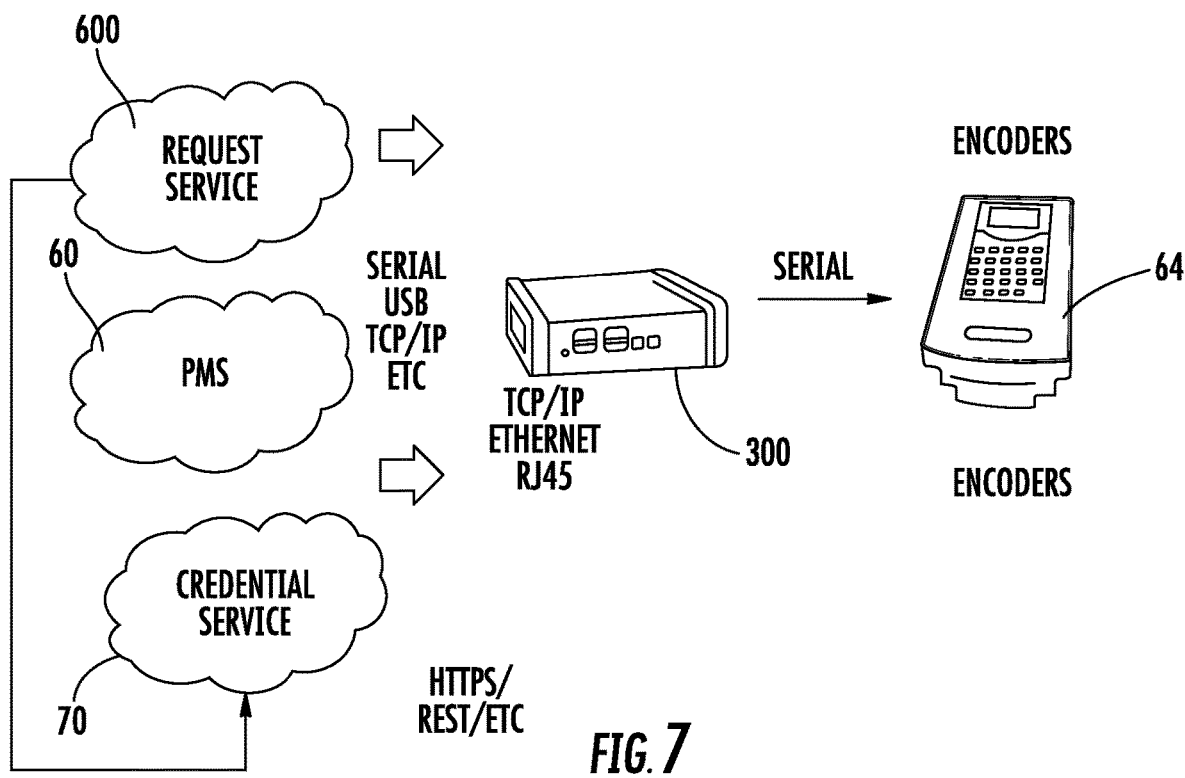
FIG. 7 is a schematic view of a PMS Multiplexer with a Request Service.

With reference to FIG. 7, in another embodiment, the PMS requests cards for physical encoding and a separate request service 600 requests virtual cards for digital encoding. In this embodiment, the device 300 receives requests from different sources and would multiplex the requests to the encoder 64 or encoders. The separate request service 600 could be deployed at the property alongside the PMS as a separate application that the front desk administrators use for enabling mobile access, or it could be a cloud based service that is integrated with hotel systems and automatically sends requests to the appropriate property and device as required. The request service 600 could be a plurality of services that could separately send requests to the device 300.

Figure 8:
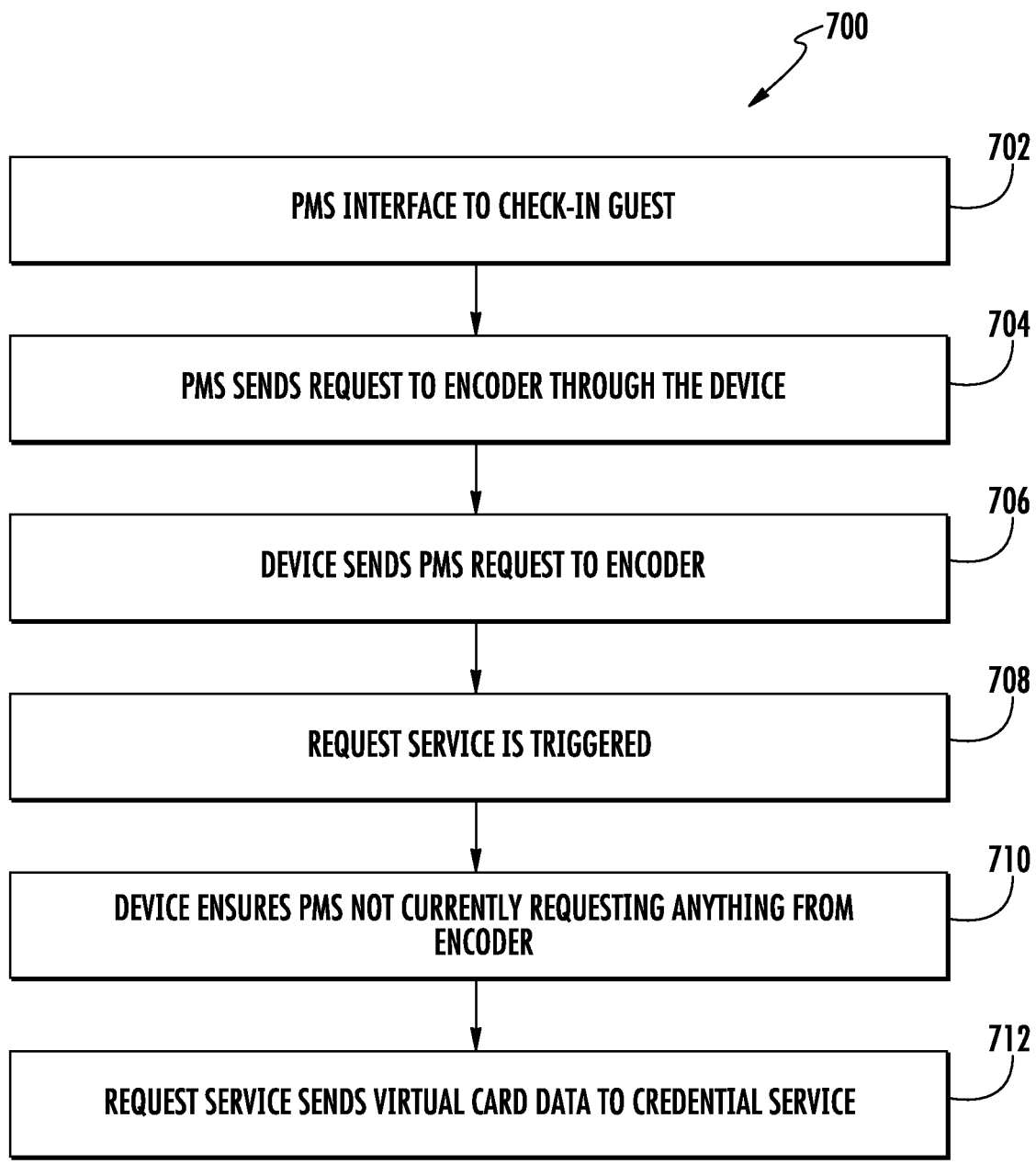
FIG. 8 is a block diagram illustrating operation of the PMS Encoder MultiPlexer with the Request Service.

In operation, the device is transparent to the PMS and encoder but would not necessarily be transparent to the request service 600. The request service 600 could use a separate communications interface to the device or it could send the same commands as a PMS but with an indication of a virtual card request as noted in the embodiment described above. With reference to FIG. 8, the alternate form of the method 700 is as follows:

The user (typically hotel staff) would use the PMS 60 interface to check-in a guest into a room (step 702).

The PMS 60 sends the request to the encoder 64 through the device 300 (step 704).

The device 300 sends the PMS 60 request directly to the encoder 64 with no modification and send the response back with no modification (step 706).

Subsequently, the request service 600 is triggered to send a request for an additional copy card virtual card using encoder "0" and sends this request to the device (step 708). The triggering of the request could be: automatic—triggered by a business process that determines the guest has opted in for virtual card access or they have a mobile phone associated with the reservation and the virtual card is offered automatically to them. Alternatively, a guest self-service that is requesting a virtual card to their phone. In these cases, the service (via guest request and reservation information) would have determined which hotel and which room and for which check-in/out dates/times the request needs to be made and then sends the request to the device 300.

The device 300 ensures that the PMS 60 is not currently requesting anything from the encoder 64 and sends the encoder 0 request to get the virtual card data and return the data back to the request service 600 (step 710). In the event that the PMS 60 tries to send a request, the device 300 will delay the PMS request until the other is complete and thus ensure service to both the PMS 60 and the request service 600 simultaneously in a "multiplexed" fashion.

The request service 600 would then send the virtual card data to the credential service 70 with enough information so that the Credential Service can send the mobile credential to the Guest phone (step 712).

An alternate embodiment for this method is where requests for virtual cards are queued in the request service 600, either automatically or by guest demand prior to the check-in on the PMS. The request service 600 is then holding a queue of requests that the device 300 will occasionally check when the PMS 60 requests to encode a card (step 704). The check is done by comparing the requested room identifier and check-in/out dates and times from the request service 600 against the PMS generated request in step 704. If a positive determination is made, after the encoder response is sent back to the PMS following step 706, the device 300 then continues with step 708 and above. An advantage of this method is that the guest gets both a physical card and a virtual card at the same time.

Another alternate embodiment for this method is where the device 300 presents a portal to a front desk administrator who accesses the portal via a computer screen connected to the device 300 or to a computer that is on the same network as the device 300. The computer screen presents the portal so that the front desk administrator can indicate a guest request for a mobile key and the requested room and whether to check them in or create a copy card. This portal and request takes the place of the request service 600 shown in the diagram above and the method then implements (step 706-710) above to send the virtual card to the guest. The PMS 64 may still be connected in this case to the device 300 or the PMS may not be connected and this alternate embodiment could be used with 'stand alone' encoders to provide digital phone access to guest rooms.

A further aspect of this embodiment is where the device 300 is a mobile device, like a tablet computer and has an integrated screen. Additionally, the device 300 with this portal could provide a full suite of front-desk options for encoding cards and managing guests. Optionally, in this embodiment the device 300 could be mobile and used for other things, like programming locks when not in use with encoder 64. Alternatively, the device 300 and encoder 64 could both be mobile and provide a roaming check-in experience for guests where the hotel administrator is 'roaming' in the lobby and helping guests with their mobile device 12 and ensuring they have virtual cards delivered to their mobile devices.

Advantageously, neither the encoder nor the PMS need to change and the hotel's investment in the encoder and PMS systems is preserved. The encoder PMS API has become a de facto standard in the industry—this multiplexer could operate with various competitor's encoders and/or they could build the same component.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A system, comprising:
a mobile device;
a credential service;
an encoder; and
a device operable to communicate with the encoder and a Property Management Systems (PMS) such that the device is operable to intercept a Property Management Systems (PMS) request to the encoder to obtain card data from the encoder, then send the card data to the credential service to provision the mobile phone with a virtual key when the request is for a virtual card, but does not send the card data to the credential service when the request is for a physical card, the device is not detectable by the mobile device, encoder or credential service, and wherein the device does not affect the operation of, or the formatting of, the data and communications that is sent back and forth to the Property Management Systems (PMS) and the encoder.

2. The system as recited in claim 1, wherein the device is a software service.

3. The system as recited in claim 1, wherein the device is a software service on the same network as the Property Management Systems (PMS).

4. The system as recited in claim 1, wherein the device is a hardware device.

5. The system as recited in claim 1, wherein a request for the virtual key is queued in a request service, the request service including a queue of requests accessible by the device.

6. The system as recited in claim 1, wherein the credential service is operable to interact with the mobile device to download and manage digital access credentials.

7. The system as recited in claim 6, wherein the credential service is operable to manage digital access credentials by creating a virtual key that is operable to operate an access control.

8. The system as recited in claim 7, wherein the mobile device includes a smartphone.

9. The system as recited in claim 7, wherein the access control is a lock.

10. The system as recited in claim 1, wherein the device is not transparent to a request service that can send requests to the device separately from the Property Management System (PMS) requests.

11. The system as recited in claim 10, wherein the request service uses a separate communications interface to the device.

12. The system as recited in claim 10, wherein the request service sends the same commands as the Property Management Systems (PMS) but with an indication of a virtual card request.

13. A method of provisioning credentials for a mobile device, the method comprising:
receiving a request from a Property Management Systems (PMS) to an encoder through a device operable to communicate with the encoder and the Property Management Systems (PMS) such that the device is operable to intercept the Property Management Systems (PMS) request to the encoder;
determining if the request is for a virtual card at the device; and
retrieving virtual card data from the encoder at the device when the request is for a virtual card and sending the card data to a credential service, the device is not detectable by the mobile device, encoder or credential service, and wherein the device does not affect the operation of, or the formatting of, the data and communications that is sent back and forth to the Property Management Systems (PMS) and the encoder.

14. The method as recited in claim 13, wherein determining if the request is for a virtual card by examining the request from the Property Management Systems (PMS).

15. The method as recited in claim 14, wherein examining the request includes identifying guest data in the request from the Property Management Systems (PMS).

16. The method as recited in claim 13, wherein the device sends the request from the Property Management Systems (PMS) directly to the encoder with no modification and sends the response back with no modification in response to a virtual card not being requested.

17. The method as recited in claim 13, wherein the method is performed in a software service that is loaded on a computer that is on the same network as the PMS software.

18. The method as recited in claim 13, wherein the request from the Property Management Systems (PMS) includes a request for a card for physical encoding and a separate request service different than the request from the Property Management Systems (PMS) requests a virtual card for digital encoding.

19. The method as recited in claim 18, wherein a request for the digital encoding is queued in the separate request service different than the request from the Property Management Systems (PMS).

20. The method as recited in claim 13, wherein the device presents a portal to a front desk administrator.

\* \* \* \* \*